June 5, 1962 R. V. WAGONER, JR., ET AL 3,037,284
SELF-CONTAINED CELESTIAL NAVIGATION DEVICE
Filed Oct. 17, 1960 3 Sheets-Sheet 1
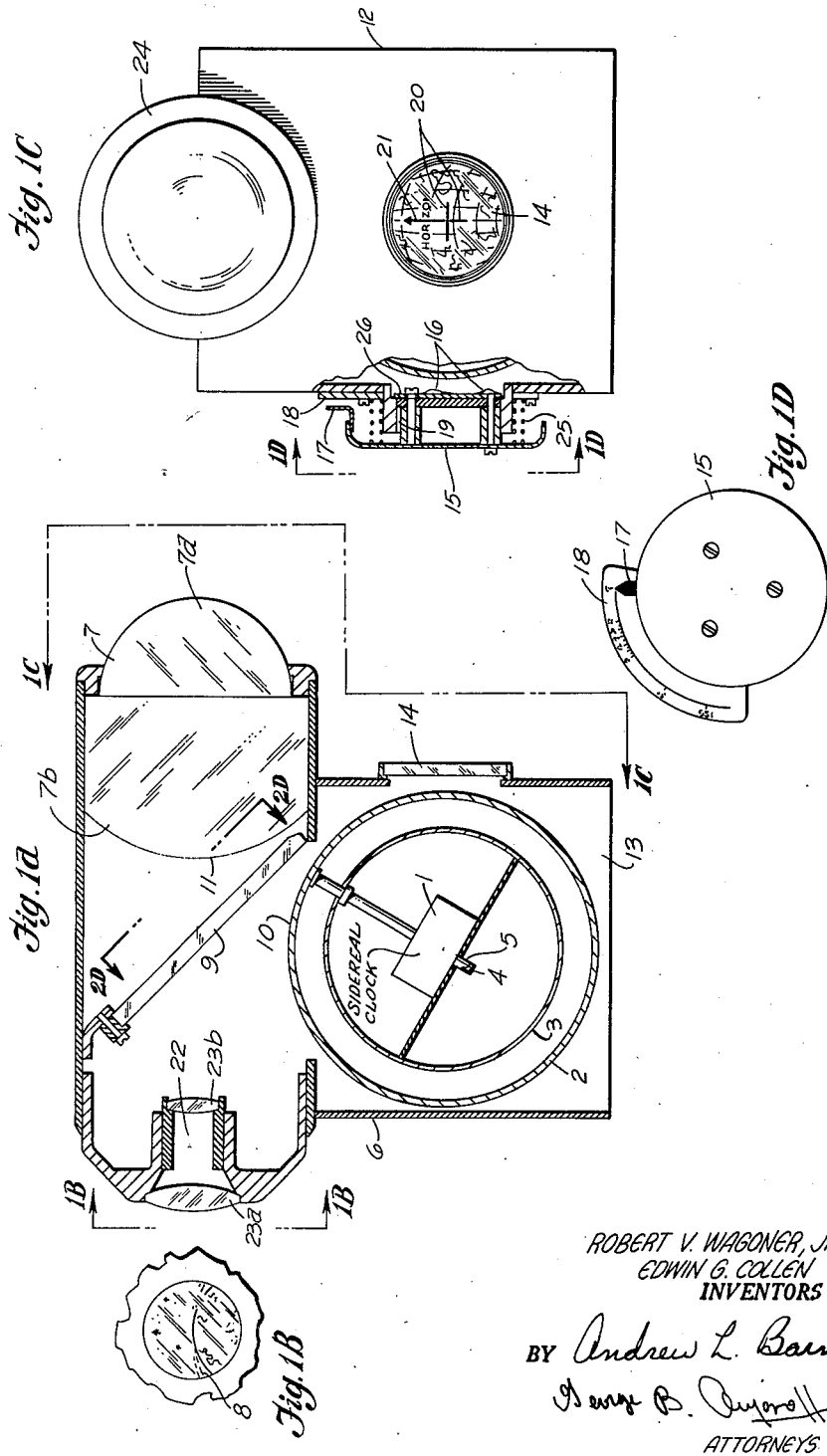
ROBERT V. WAGONER, JR.
EDWIN G. COLLEN
INVENTORS
BY
ATTORNEYS June 5, 1962  R. V. WAGONER, JR., ET AL  3,037,284
SELF-CONTAINED CELESTIAL NAVIGATION DEVICE
Filed Oct. 17, 1960  3 Sheets-Sheet 2
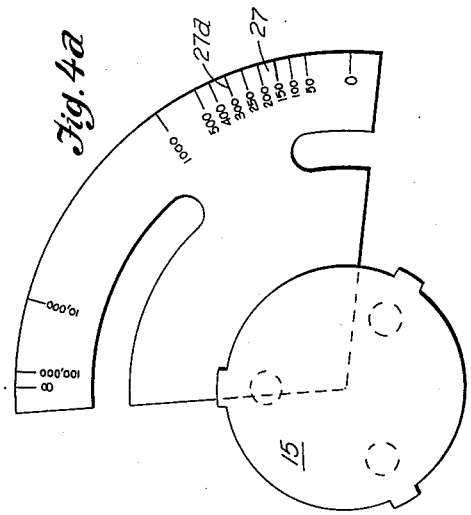
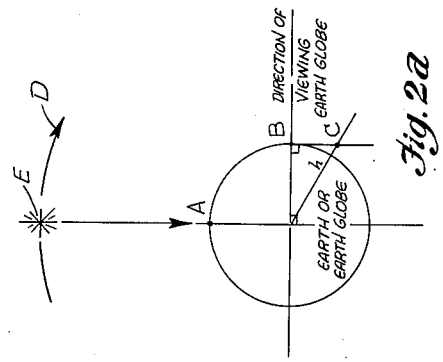
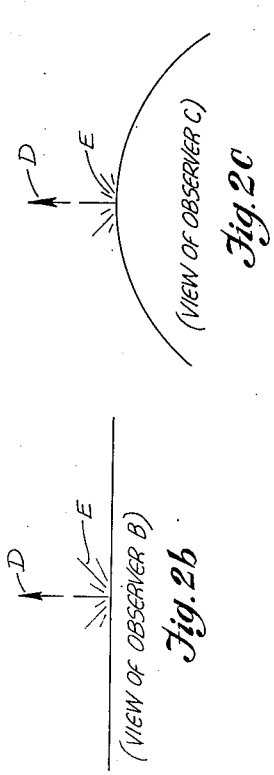
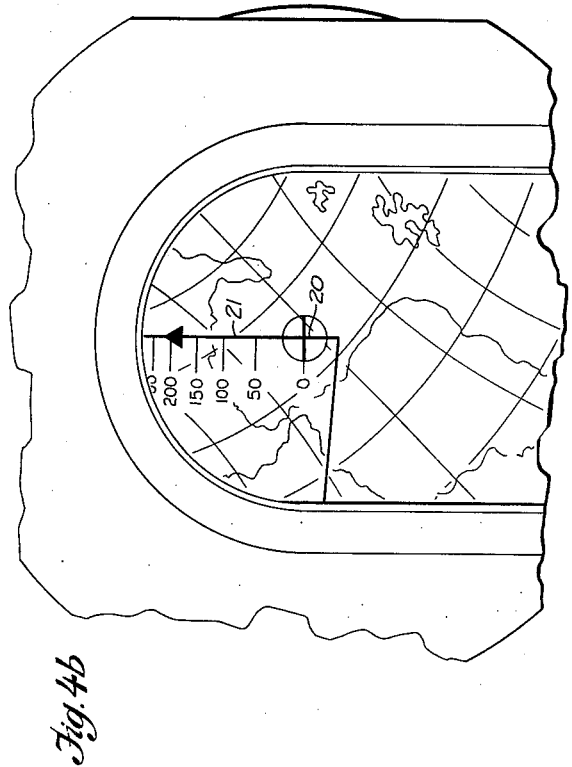
ROBERT V. WAGONER, JR.
EDWIN G. COLLEN
INVENTORS
BY Andrew L. Bain
George B. Augerott
ATTORNEYS June 5, 1962  R. V. WAGONER, JR., ET AL  3,037,284
SELF-CONTAINED CELESTIAL NAVIGATION DEVICE
Filed Oct. 17, 1960  3 Sheets-Sheet 3
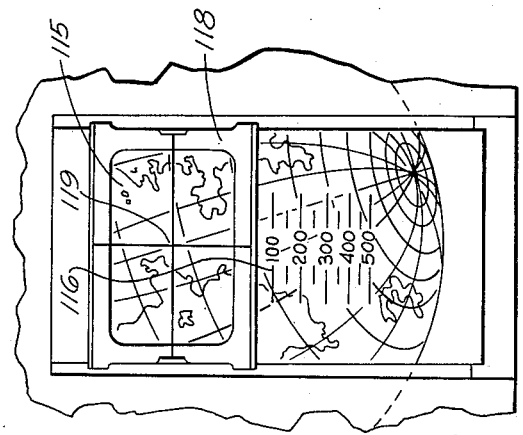
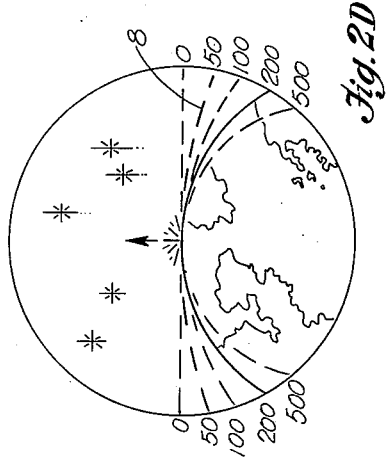
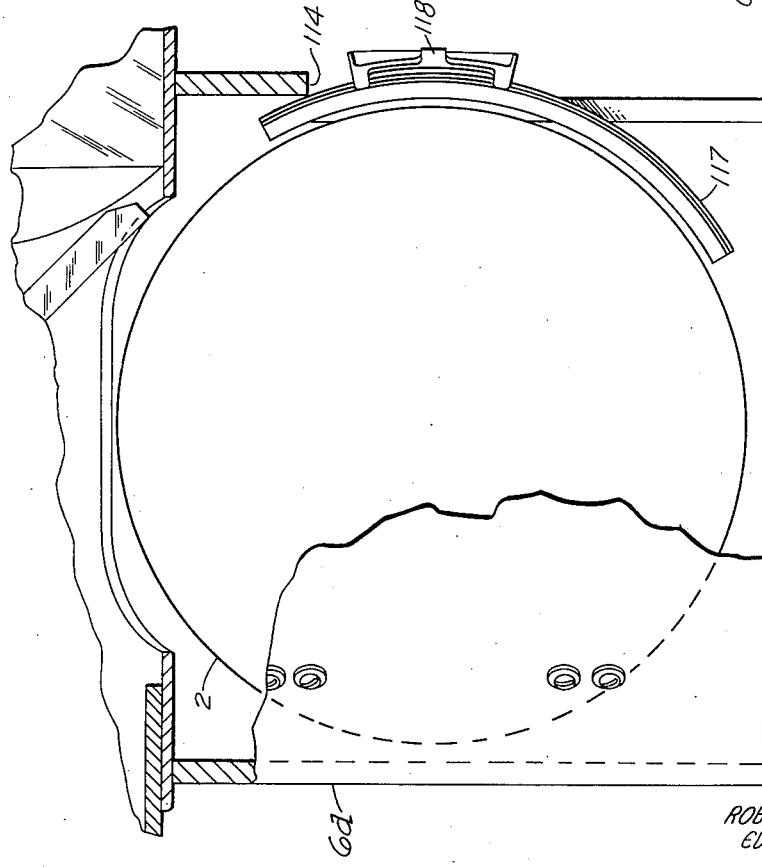
ROBERT V. WAGONER, JR.
EDWIN G. COLLEN
INVENTORS
BY Andrew L. Bain
George B. Oujevolk
ATTORNEYS United States Patent Office 3,037,284
Patented June 5, 1962

3,037,284
SELF-CONTAINED CELESTIAL NAVIGATION DEVICE
Robert V. Wagoner, Jr., West Englewood, and Edwin G. Collen, Morris Plains, N.J., assignors to General Precision Inc., Little Falls, N.J., a corporation of Delaware
Filed Oct. 17, 1960, Ser. No. 63,131
8 Claims. (Cl. 33—1)

The present invention relates to a celestial navigation device, and more particularly to a device which will readily provide the relative position of an observer and his direction of movement with respect to the Earth without the necessity of mathematical computations.

With the arrival of the age of jet and space navigation, it has become increasingly imperative for an occupant of a space vehicle, or rapidly flying aircraft to be able to immediately ascertain his relative position over the Earth. Although many systems have been developed employing highly accurate computers which will provide such information, a system is also required where no computers are used. Despite the fact that the high accuracy of a computer system may not be attainable in an automatic or self-contained system, it has the advantage that anybody can operate it with little training. Uneducated or untrained airmen or spacemen may have to navigate a space vehicle; men in space rendered ill or weak because of conditions there may suddenly be required to ascertain their position; charts, tables, computers etc. may be destroyed during a space flight. But, even with charts, tables, computers, etc. flight situations may arise where, because of extreme danger to the occupants in a space-vehicle, they must navigate the vehicle by instinct rather than sit down calmly and calculate the vehicle's position. To meet such situations, a highly ingenious self-contained navigation device has been proposed by Capt. Philip V. H. Weems. According to the device invented by Capt. Weems, a transparent star hemisphere is arranged with a sidereal hour angle and declination grid thereon and a suitable eye piece is provided for sighting from the effective center of the hemisphere out toward the Earth disc as observed from the space vehicle. By selecting a suitable hemisphere depending upon the relative position of the Earth and the space vehicle, the star field observed beyond the Earth and particularly the stars which surround the Earth disc as observed from the space vehicle can be aligned with the stars marked on the star globe. Orientation of the star globe such that two known stars on the globe coincide with the observed position of the same stars in the star field surrounding the Earth disc will result in orientation of the globe in a manner such that the polar axis of the globe is parallel to the polar axis of the Earth. For this condition, the sidereal hour angle and declination grid on the star globe are, in effect, projected onto the celestial sphere in which the starfield is observed, and the position of the Earth disc in this projected grid corresponds with the position of the space vehicle above the surface of the Earth. The exact location of the space vehicle will therefore correspond to the center of the Earth disc as it is positioned on the sidereal hour angle and declination grid of the star globe. A modification of Capt. Weems' invention provides a direct indication of the space vehicle's position in terms of Earth latitude and longitude. Altitude is determined by measuring the subtended angle of the Earth disc. A sidereal clock drives the Earth hemisphere relative to the star hemisphere.

However, the method just described has some serious drawbacks. The eye must be exactly positioned at the center of the hemispheres. This method is obviously not very flexible, since differently shaped braces may have to be designed to fit every shape head and every type of helmet worn by an astronaut. Even then, the eye can never be exactly positioned. Another disadvantage is that separate hemispheres must be used, which complicates use of the instrument. In addition, the entire Earth disc must be viewed, which becomes difficult at low altitudes, with a small viewing port, or in the instance where the space vehicle is pitching or rolling. The Earth disc center may be difficult to determine, especially at low altitudes. The size and shape of the device makes it difficult to view a wide field of vision from within a space vehicle unless a large or spherical viewing window is available.

Although attempts may have been made to provide improvements over the device of Capt. Weems, or similar self-contained celestial navigation devices, none, as far as we are aware was ever successful when carried out into actual practice.

It has now been discovered that means can be provided whereby position on or above the Earth's surface (latitude and longitude of observer's sub-point) and direction of viewing can be determined directly by sighting on a portion of the Earth's horizon and the stars above it. The instrument contemplated may be small, hand-held, manually operated, and provides an approximate measurement of altitude.

Thus, it is an object of the present invention to provide a self-contained celestial navigation device which requires no computer arrangement to provide the observer's position.

Another object of the present invention is to provide such a device which is small, compact, hand-held, and manually operated.

Still another object of the present invention is to provide such a device which can be operated by persons without technical training.

Yet another object of the present invention is to provide a device whereby position over the earth can readily be determined by visual observation.

With the foregoing and other objects in view, the invention resides in the novel arrangement and combination of components and in the detailes of construction hereinafter described, it being understood that changes in the precise embodiment of the invention herein disclosed may be made within the scope of what is described without departing from the spirit of the invention.

Generally speaking, the present invention contemplates, i.e. features, inter alia, a navigation device comprising in combination; Earth and star simulating means; star imaging means for presenting the images of real stars magnified to about the size of said simulated stars; superimposing means associated with said star imaging means adapted to superimpose the images of said simulated stars at their zenith with respect to a place on said simulated Earth upon the images of said real stars on the horizon; altitude estimation means associated with said imaging means providing the observer's altitude; a viewing section in said device disposed at about ninety degrees to said zenith position; and altitude correction means associated with said viewing section providing observer's corresponding position on said simulated Earth as a distance from a position ninety degrees from said zenith position corresponding to the estimated altitude.

The advantages of the invention will become apparent from the following description taken in conjunction with the accompanying drawing in which:

FIGURE 1A is a longitudinal cross sectional view of the navigational instrument contemplated herein;

FIGURE 1B is a representation of the view as seen by an observer looking into the optical system of the device contemplated herein from the lines 1B—1B of FIGURE 1;

FIGURE 1C is an end view of the navigational instrument herein contemplated along the lines 1C—1C of FIGURE 1A;

FIGURE 1D is a view of the altitude corrector contemplated herein, shown along lines 1D—1D of FIGURE 1C;

FIGURE 2A illustrates graphically the theoretical principles utilized by the instrument contemplated herein with reference to a particular star seen from positions on Earth and above the Earth;

FIGURE 2B depicts the view of said particular star seen by observer B of FIGURE 2A who is on Earth;

FIGURE 2C shows the view on the horizon of said particular star seen by observer C of FIGURE 2A who is above the Earth;

FIGURE 2D shows how the observer C of FIGURE 2C determines his altitude by making use of the instrument illustrated in FIGURE 1A and making use of the scale disposed along view 2D—2D of FIGURE 1A;

FIGURE 3A illustrates a modified embodiment of the device shown in FIGURE 1A;

FIGURE 3B shows a front view of the embodiment illustrated in FIGURE 3A;

FIGURE 4A depicts another modified embodiment similar to that shown in FIGURE 3A; and, FIGURE 4B is a front view of the embodiment shown in FIGURE 4A.

In the contemplated instrument, a sidereal clock 1 drives a transparent star globe 2 around an opaque Earth globe 3. The sidereal clock 1 is mounted within the Earth globe and drives the Earth globe 3 and star globe 2 relative to each other by means of concentric shafts 4 and 5. The sidereal clock 1 is driven electrically or mechanically from within the Earth globe 3. The transparent star globe 2 is painted with phosphorescent paint at points corresponding to the positions of the major navigational stars as they would be viewed from the center of the globe. The star globe 2 is mounted within a housing 6 by means described below so that it is free to rotate in any direction relative to the housing 6. A special double spherical plano-convex plastic wide-angle lens assembly 7 is used to focus the image of the Earth's horizon and of the stars above the horizon on its back surface 11 which is ground to constitute a screen. That is to say that two plano-convex spherical lenses 7a and 7b are placed in back to back relationship, and the radii of curvature of both lenses are such that the focal plane providing the image of a star seen by outer lens 7a will be projected on the back surface of inner lens 7b. In order to accomplish this, the radius of curvature of the surface of the smaller outer lens 7a is made equal to $R(N-1)$ where R is the radius of the larger or inner lens surface and N is the refractive index of both lenses, i.e., of lens assembly 7. Moreover, the radius of curvature of the larger inner lens is made equal to the radius of star globe 2. Therefore, the image of a particular star field formed by lens assembly 7 on the back surface 11 thereof will correspond exactly in size and shape to one of the star fields 10 painted on star globe 2. In other words, the images of the real stars will, as a pattern, be of the same size as the stars on the star globe. On the ground back surface of lens assembly 7 are inscribed circle arcs 8 corresponding to the horizon outline of the Earth as seen from various altitudes. Those circle arcs 8 ar tangent at the center of the lens back surface. The purpose of these circular arcs will soon become clear.

Star globe 2 is offset from the axis of lens assembly 22 and lens assembly 7, so that a beam splitting mirror 9, disposed tangentially to star globe 2 and inner lens 7b allows an observer looking at the back surface of lens assembly 7 to see the image of a star field 10 on star globe 2 superimposed on the image of the identical star field formed by the image of the real stars on the surface 11 on the back of lens assembly 7. Star globe 2 is rotatable by hand in any direction through the access ports 12 and 13 of housing 6. In determining one's position, Earth globe 3 is viewed through star globe 2 and a reticle window 14 located so as to provide a view of Earth globe 3 at a position ninety degrees from the point under beam splitting mirror 9, the star globe 2 having been so rotated or positioned that the image of the star field 10 coincides with or is superimposed on the image of the real stars formed on the surface 11 of lens assembly 7. Reticle window 14 has cross-hairs 20 on its front and back surface which indicate the space vehicle's sub-point on Earth. An arrow 21 indicates the direction on Earth of the horizon viewed. An altitude corrector 15 is adapted to be keyed to housing 6 so that it may rotate only when it has made positive contact with the star globe 2. Thus, when altitude corrector 15 is pushed against i.e., keyed to star globe 2, it will rotate the star globe by means of three small friction members 16 located on altitude corrector 15. A pointer 17 on the altitude corrector 15 rotates below a dial 18 which is calibrated in miles above the Earth's surface. When altitude corrector 15 is not depressed, i.e., does not engage star globe 2, key 19 is in the locked position and prevents its rotation. In this position, the pointer 17 is at zero with respect to dial 18. A lens system 22 consisting of an eyepiece 23a and erector lens 23b erects the image of the stars and the horizon. A cylindrical housing 24 encloses lens 7, 23a, 23b and beam splitting mirror 9 so that star field 10 is projected by beam splitting mirror 9 into the lens system 22 to be compared with the image of real stars at surface 11.

In order to give those skilled in the art a better understanding of the invention, the operational principles upon which the instrument is based are illustrated in FIGURES 2A, 2B, 2C and 2D. Consider a star group D containing a single star E at the zenith of observer A on Earth. Neglecting atmospheric refraction, an observer B on the surface of the Earth at a position ninety degrees from A will see the right-hand half of star group D above his horizon, with star E directly on the horizon in the center of his field of view. An observer C at a height of H above the surface of the Earth in the plane tangent at B will see the same view of the horizon and the star group D as observer B, except that his horizon will be curved. However, the star group D will appear in the same position as it does to observer B, and the same star E will be directly on the horizon, providing that C is in the same plane as A, B, E, and the center of the Earth O. At any specified altitude, one view of a star group above any horizon uniquely determines the geographic position of the observer's sub-point on Earth. Referring again to FIGURE 1, the observer operates the instrument by first sighting through the lens system 22 and 7, toward any section of the horizon in view. He then positions the star globe 2 by hand until the image of the real stars seen corresponds with the image of the stars of field 10 as seen on the star globe 2. At the same time, the image of the horizon outline is centered in his field of view so that it can be compared with the horizon outlines 8. Each horizon outline 8 has a corresponding altitude marker on it, so that the observer can determine his altitude by interpolating from the spacing of the horizon image between the corresponding horizon outlines 8. The image and the outlines 8 must be tangent at the point where all the outlines 8 are tangent. At the instant when the horizons are matched and the star images are superimposed, the altitude corrector 15 is depressed against or keyed to star globe 2. The instrument may now be moved to any position. The altitude corrector 15 is now rotated until the pointer 17 is positioned on the dial 18 corresponding to the altitude determined by matching the horizons. Auxiliary altitude indications may alternatively be used to set the altitude corrector 15. Once the altitude corrector 15 has been set to the correct altitude, the observer then looks at the Earth globe 3 through the reticle window 14. The center of the cross-hairs 20 indicates the position on Earth of the imaginary line from the observer to the center of the Earth. The arrow 21 shows him the direction on Earth of the horizon which he has viewed. When the necessary information has been recorded, the observer rotates the altitude corrector 15 back to zero, where its springs 25 force it back in the keyways 19 against its stop 26. Referring again to FIGURE 2, the operation of the instrument may be visualized as first superposing the painted star field above A with the real stars. The altitude found by matching the horizons then determines the angle through which the Earth globe 3 is rotated from C to B. Point B was originally beneath the cross-hairs 20.

Although the embodiment just described is an excellent medium to explain the basic principles of the device herein contemplated, it has the disadvantage that the star globe must be physically moved by the altitude corrector. In practice, it is much easier for Mohammed to go to the mountain than to bring the mountain to Mohammed, i.e., it is much easier to move the altitude corrector with respect to the Earth and star globes than to move those globes to compensate for the altitude. Since the motion is relative, the theoretical end result should be the same. In practice, it is much simpler to move a piece of transparent plastic than the Earth and star globes in addition to the clock means. The result is more accurate, faster, more automatic, and less liable to errors in human judgment once the observer using the device understands what is taking place.

In FIGURES 3A and 3B is shown a star globe 2 in a slightly modified housing 6a. Instead of a reticle 14, there is a sphero-rectangular aperture 114 providing a view of about sixty degrees of longitudinal arc. Interposed between globe 2 and aperture 114 is a rigid transparent plastic segment 115 having inscribed thereon lines 116 graduated in altitude distances corresponding to the altitude horizon tangential arcs 8. In other words, line zero of lines 116 corresponds to a zero altitude reading and line fifty of lines 116 corresponds to the fifty mile altitude reading, etc. Adapted to move over aperture 114 on rails 117 is a moving reticle 118 having cross hairs 119 at the center thereof. Preferably two sets of cross hairs on both the inner and outer surface of the reticle are used to prevent parallax. Once the image of the stars are superimposed and the image of the real horizon has been compared with horizon outlines 8 and the altitude estimated, moving reticle 118 is simply slid along the rails to the proper spherical line 116 or to the interpolated position corresponding to the proper altitude.

In lieu of a moving reticle 118, it is also possible to have at aperture 114 a moving plastic indicator 27 having a scale 27a corresponding to the altitude. Indicator 27 is rigidly attached to altitude corrector 15 and is in the shape of one-eighth the surface of a sphere, and fits between star globe 2 and housing 6, of FIGURE 1A. The cross-hairs 20 of window reticle 14 act as a stationary pointer, while indicator 27 rotates with altitude corrector 15 past the cross-hairs. The altitude is brought to the cross hairs and the observer's position is located at the zero altitude point.

Based upon the foregoing conception, other modifications are possible. Instead of using lens system 7, smaller lenses may be used in combination with a spheroidal focal plane on which the lens image is projected, the only requirement being that the size of the real star images projected will generally correspond and can be made to coincide with the stars on the star globe. Should the viewing lens break during a space flight, the device may still be used except that without an erecting system, the star and horizon images will be inverted.

In describing the foregoing devices, little has been said as to the means of supporting the star globe for free rotation in the housing. Basically, this is a design problem and is accomplished by ball bearings carefully placed between the star globe and housing. To better explain the working of the invention, this feature of the device has been purposely omitted; however, in building the device a sufficient number of ball bearings must be placed in the housing as to permit free rotation of the star globe therein and yet firmly support the star globe, Earth globe and clock assembly. It also goes without saying that suitable means must be provided to wind or charge the sidereal clock which should be carefully checked periodically. The accuracy of the instrument described herein will of course depend on the size of the Earth globe. This size in turn will depend on the nature of the problem to be solved. Some space vehicles presently contemplated are designed to re-enter the Earth atmosphere so as to come down only in the water. Therefore, the only position problem to be solved with an instrument of this type is to determine that the vehicle will fall somewhere in the Atlantic or Pacific oceans. Although this may at first appear to be an easy task, the psychological and physical condition of a space vehicle crew must not be discounted. In such a case, a small instrument with star globe diameter and housing cross-section less than twelve inches across will readily and accurately provide not only information as to whether the vehicle will fall over land or water but the district, state or country of landing. The device may also be used on ships and in large aircraft, and, if the Earth globe diameter is about three feet, position can be determined with fair accuracy within a radius of about three to five miles. The present invention also provides a unique means of checking a position obtained by a navigator with conventional navigation instruments, either on shipboard, in an aircraft, or in a space vehicle.

It is to be observed therefore that the present invention provides for a celestial navigation device, comprising in combination, an Earth globe 3; a star globe 2 surrounding said Earth globe having thereon the major navigational stars; a housing 6 supporting said star globe permitting the free rotation of said star globe therein and the physical turning of said star globe; sidereal clock means 1 driving one of said globes with reference to the other globe simulating the movement of the stars over the Earth: optical means 7 and 22 through which can be real stars on the horizon and the real horizon, the magnification power of said optical means being such that the images of said real stars will be of the same size as the stars on said star globe; beam splitting mirror means 9, so disposed in said optical means 7 and 22 with respect to said star globe 2 as to reflect said star globe stars as superimposed on the images of said real stars thereby enabling the matching up of said star globe stars with said real stars by the physical turning of said star globe, said Earth globe 3 also turning with said star globe so that the real stars, which are imaged, on the horizon are matched with star globe stars at their zenith with respect to said Earth globe; graduated altitude curvature lines 8 disposed in said optical means enabling an observer to match the curvature of the Earth disc, which is imaged, between said graduated altitude curvature lines and estimate the altitude of the device by interpolation between graduations; a viewing section 14 or 114 in said housing generally disposed so as to provide a view of said Earth globe at ninety degrees to the aforesaid Earth globe zenith; altitude correction scale means 15 associated with said viewing section enabling the observer to determine his position C on said Earth globe as a scale distance from a position B ninety degrees from the aforesaid Earth globe zenith A, said scale distance corresponding to the altitude provided by said altitude curvature lines. Correction for altitude may be made either by moving the Earth globe 3 with respect to the ninety degree position B, by moving the altitude corrector 27 with respect to the ninety degree position; or by moving the reticle 118 with respect to the ninety degree position. Furthermore, the position B, ninety degrees from the Earth globe zenith A and the altitude correction distance between said ninety degree position and observer's position C, on the Earth globe should define a single plane passing through the longitudinal axis of optical means 7 and 22 and the center of Earth globe 3. This longitudinal optical axis is of course the axis formed or erected by the optical system, which may differ from the physical axis in a prism system.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A navigation device, comprising in combination; Earth and star simulating means; star imaging means for presenting the image of real stars magnified to about the size of said simulated stars; superimposing means associated with said star imaging means adapted to superimpose the images of said simulated stars, at their zenith with respect to a position on said simulated Earth, upon the images of the real stars on the horizon; altitude estimation means associated with said imaging means providing observer's altitude; a viewing section in said device disposed at about ninety degrees to said zenith position; altitude correction means associated with said viewing section providing observer's corresponding position on said simulated Earth as a distance from a position about ninety degrees from said zenith position corresponding to the estimated altitude.

2. A navigation device, comprising in combination; Earth and star simulating means; star imaging means for presenting the images of real starts magnified to about the size of said simulated stars; superimposing means associated with said star imaging means adapted to superimpose the images of said simulated stars, at their zenith with respect to a position on said simulated Earth, upon the images of the real stars on the horizon; altitude estimation means associated with said imaging means providing the observer's altitude; a viewing section in said device disposed in the plane defined by said star imaging means longitudinal optical axis and said simulated Earth center at about ninety degrees to said zenith position; altitude correction means associated with said viewing section providing observer's corresponding position on said simulated Earth as a distance in said plane from a position about ninety degrees from said zenith position corresponding to the estimated altitude.

3. A celestial navigation device, comprising in combination; an Earth globe, star globe and sidereal clock means driving one of said globes with reference to the other simulating movement of stars over the Earth; optical imaging means for presenting images of real stars of such magnification power that the images of said real stars are of about the same size as said star globe stars; optical superimposing means so disposed in association with said optical imaging means as to superimpose images of said star globe stars on the images of said real stars enabling the matching up of said star globe stars at their zenith position with respect to a position on said Earth globe with real stars on the horizon; altitude estimation means disposed in said optical means; a viewing section in said device disposed in the plane defined by said optical imaging means longitudinal optical axis and said Earth globe center at about ninety degrees to the aforesaid zenith position; altitude correction means associated with said viewing section providing observer's position on said Earth globe as a distance in said plane from a position ninety degrees from said zenith position corresponding to the estimated altitude.

4. A celestial navigation device, comprising in combination; an earth globe; a star globe surrounding said Earth globe having thereon the major navigational stars; a housing supporting said star globe permitting the free rotation of said star globe therein and the physical turning of said star globe; sidereal clock means driving one of said globes with reference to the other globe simulating the movement of the stars over the Earth; optical means through which can be imaged the real stars on the horizon and the real horizon, the magnification power of said optical means being such that the images of said real stars will be of the same size as stars on said star globe; beam splitting mirror means, so disposed in said optical means with respect to said star globe as to reflect the images of said star globe stars as superimposed on the images of said real stars thereby enabling the matching up of said star globe stars with said real stars by the physical turning of said star globe, said Earth globe also turning with said star globe so that the real stars, which are imaged, on the horizon are matched with star globe stars at their zenith with respect to a position on said Earth globe; graduated altitude curvature lines disposed in said optical means enabling an observer to match the curvature of the Earth disc, which is imaged, between said graduated altitude curvature lines and estimate the altitude of the device by interpolation between graduations; a viewing section in said housing generally disposed so as to provide a view of said Earth globe at ninety degrees to the aforesaid Earth globe zenith in the plane of said optical means longitudinal optical axis and said Earth globe center; altitude correction scale means associated with said viewing section enabling the observer to determine his position on said Earth globe as a scale distance in said plane from a position ninety degrees from the aforesaid Earth globe zenith, said scale distance corresponding to the altitude provided by said altitude curvature lines.

5. A celestial navigation device, comprising in combination; an earth globe; a star globe surrounding said Earth globe having thereon the major navigational stars; a housing supporting said star globe permitting the free rotation of said star globe therein and the physical turning of said star globe; sidereal clock means driving one of said globes with reference to the other globe simulating the movement of the stars over the Earth; optical means through which can be imaged the real stars on the horizon and the real horizon, the magnification power of said optical means being such that the images of said real stars will be of the same size as stars on said star globe; beam splitting mirror means, so disposed in said optical means with respect to said star globe as to reflect the images of said star globe stars as superimposed on the images of said real stars thereby enabling the matching up of said star globe stars with said real stars by physically turning said star globe, said Earth globe also turning with said star globe so that the real stars, which are imaged, on the horizon are matched with star globe stars at their zenith with respect to a position on said Earth globe; graduated altitude curvature lines disposed in said optical means enabling an observer to match the curvature of the Earth disc, which is imaged, between said graduated altitude curvature lines and estimate the altitude of the device by interpolation between graduations; a viewing section in said housing generally disposed so as to provide a view of said Earth globe at ninety degrees to the aforesaid Earth globe zenith in the plane of said optical means longitudinal optical axis and said Earth globe center; an altitude corrector scale disposed on said device, said scale generally corresponding to said graduated altitude curvature lines; pointer means movable along said scale; and star globe engaging means adapted to engage said star globe in response to actuation by said pointer means and move said star globe along an arc in said defined plane a distance corresponding to the movement of said pointer means along said scale thereby providing observer's position on said Earth globe as a scale distance from said position ninety degrees to the Earth globe zenith in said defined plane, corresponding to said estimated altitude.

6. A celestial navigation device, comprising in combination; an Earth globe; a star globe surrounding said Earth globe having thereon the major navigational stars; a housing supporting said star globe permitting the free rotation of said star globe therein and the physical turning of said star globe; sidereal clock means driving one of said globes with reference to the other globe simulating the movement of the stars over the Earth; optical means through which can be imaged the real stars on the horizon and the real horizon, the magnification power of said optical means being such that the images of said real stars will be of the same size as the stars on said star globe; beam splitting mirror means, so disposed in said optical means with respect to said star globe as to reflect the images of said star globe stars as superimposed on the images of said real stars thereby enabling the matching up of said star globe stars with said real stars by the physical turning of said star globe, said Earth globe also turning with said star globe so that the real stars, which are imaged on the horizon are matched with star globe stars at their zenith with respect to a position on said Earth globe; graduated altitude curvature lines disposed in said optical means enabling an observer to match the curvature of the Earth disc, which is imaged, between said graduated altitude curvature lines and estimate the altitude of the device by interpolation between graduations; a viewing section in said housing generally disposed so as to provide a view of said globe at ninety degrees to the aforesaid Earth globe zenith in the plane defined by said optical means longitudinal optical axis and said Earth globe center; an altitude corrector scale disposed on said device in a parallel plane to said defined plane, said scale generally corresponding to said graduated altitude curvature lines; pointer means movable along said scale in said parallel plane; and star globe engaging means adapted to engage said star globe in response to actuation by said pointer means and move said star globe along an arc in said scale thereby providing observer's position on said Earth globe as a scale distance from said position ninety degrees to the Earth globe zenith in said defined plane; corresponding to said estimated altitude.

7. A celestial navigation device, comprising in combination, an Earth globe; a star globe surrounding said Earth globe having thereon the major navigational stars; a housing supporting said star globe permitting the free rotation of said star globe therein and the physical turning of said star globe; sidereal clock means driving one of said globes with reference to the other globe simulating the movement of the stars over the Earth; optical means through which can be imaged the real stars on the horizon and the real horizon, the magnification power of said optical means being such that the images of said real stars will be of the same size as the stars on said star globe; beam splitting mirror means, so disposed in said optical means with respect to said star globe as to reflect the images of said star globe stars as superimposed on the images of said real stars thereby enabling the matching up of said star globe stars with said real stars by the physical turning of said star globe, said Earth globe also turning with said star globe so that the real stars, which are imaged, on the horizon are matched with star globe stars at their zenith with respect to a position on said Earth globe; graduated altitude curvature lines disposed in said optical means enabling an observer to match the curvature of the Earth disc, which is imaged, between said graduated altitude curvature lines and estimate the altitude of the device by interpolation between graduations; a viewing section in said housing generally disposed so as to provide an arcuate field of view of said earth globe beginning at a position on said Earth globe at about ninety degrees to the aforesaid Earth globe zenith, said viewing section providing a view of an arc extending in a plane defined by said optical means longitudinal optical axis and said Earth globe center; an altitude corrector scale disposed on said device so as to move through said viewing section in said defined plane, said scale generally corresponding to said graduated altitude curvature lines; and, a ninety degree marker in said viewing section, the observer's position being read as a distance from said marker along said scale corresponding to said estimated altitude.

8. A celestial navigation device, comprising in combination, an earth globe; a star globe surrounding said Earth globe having thereon the major navigational stars; a housing supporting said star globe permitting the free rotation of said star globe therein and the physical turning of said star globe; sidereal clock means driving one of said globes with reference to the other globe simulating the movement of the stars over the Earth; optical means through which can be imaged the real stars on the horizon and the real horizon, the magnification power of said optical means being such that the images of said real stars will be of the same size as the stars on said star globe; beam splitting mirror means, so disposed in said optical means with respect to said star globe as to reflect the images of said star globe stars as superimposed on the images of said real stars thereby enabling the matching up of said star globe stars with said real stars by the physical turning of said star globe, said Earth globe also turning with said star globe so that the real stars, which are imaged, on the horizon are matched with star globe stars at their zenith with respect to a position on said Earth globe; graduated altitude curvature lines disposed in said optical means enabling an observer to match the curvature of the Earth disc, which is imaged between said graduated altitude curvature lines and estimate the altitude of the device by interpolation between graduations; a viewing section in said housing generally disposed so as to provide an arcuate field of view of said Earth globe beginning at a position on said Earth globe at about ninety degrees to the aforesaid Earth globe zenith, said viewing section providing a view of an arc extending in a plane defined by said optical means longitudinal optical axis and said Earth globe center; a fixed altitude corrector scale disposed over said Earth and star globes in said viewing section, said scale generally corresponding to said graduated altitude curvature lines, the zero point on said scale being located precisely at ninety degrees to the aforesaid zenith in said defined plane; and a reticle, having crosshairs thereon movable over said viewing section said crosshairs moving only along an arc in said defined plane, observer's position on said Earth globe being a scale distance from said zero point corresponding to said estimated altitude.

References Cited in the file of this patent

UNITED STATES PATENTS

| 2,337,587 | Brocky | Dec. 28, 1943 |
| 2,407,467 | Barry | Sept. 10, 1946 |
| 2,960,906 | Fogel | Nov. 22, 1960 |
| 2,968,228 | Merritt | Jan. 17, 1961 |
| 3,002,278 | Weems | Oct. 3, 1961 |

FOREIGN PATENTS

| 478,374 | France | Sept. 18, 1915 |
| 749,438 | Germany | Nov. 22, 1944 |
| 792,554 | France | Oct. 3, 1960 |